United States Patent
Li et al.

(10) Patent No.: US 6,389,164 B2
(45) Date of Patent: *May 14, 2002

(54) IMAGE SEGMENTATION APPARATUS AND METHOD

(75) Inventors: Xing Li, Webster; Michael E. Meyers, Fairport; Francis K. Tse, Rochester, all of NY (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/158,788

(22) Filed: Sep. 23, 1998

(51) Int. Cl.[7] .................................................. G06K 9/34
(52) U.S. Cl. ........................ 382/176; 382/273; 382/274; 358/462
(58) Field of Search ................................. 382/170, 172, 382/176, 180, 273, 274, 275; 358/443, 456, 463, 464

(56) References Cited

U.S. PATENT DOCUMENTS

| 4,194,221 A | | 3/1980 | Stoffel |
| 4,740,843 A | | 4/1988 | De Vogel et al. |
| 5,025,481 A | * | 6/1991 | Ohuchi .................... 382/176 |
| 5,754,708 A | * | 5/1998 | Hayashi et al. .......... 358/462 |

* cited by examiner

*Primary Examiner*—Amelia M. Au
*Assistant Examiner*—Jingge Wu
(74) *Attorney, Agent, or Firm*—Oliff & Berridge, PLC

(57) ABSTRACT

The present invention provides a method and apparatus for classifying image data. A video peak/valley counter may count peaks and valleys within a window of the input image data. The apparatus and method checks whether any peaks or valleys are located within a neighborhood of a pixel under consideration.

12 Claims, 9 Drawing Sheets

| 200 | 50 | 50 | 200 | 50 |
|-----|----|----|-----|----|
| 200 | 50 | 50 | 200 | 50 |
| 200 | 50 | 50 | 200 | 50 |
| 200 | 50 | 50 | 200 | 50 |
| 200 | 50 | 50 | 200 | 50 |

FIG. 5A

| 75 | 80 | 200 | 125 | 50 |
|----|----|-----|-----|----|
| 75 | 80 | 200 | 125 | 50 |
| 75 | 80 | 210 | 125 | 50 |
| 75 | 80 | 210 | 125 | 50 |
| 75 | 80 | 200 | 125 | 50 |

FIG. 5B

IMAGE SEGMENTATION APPARATUS AND METHOD

BACKGROUND OF THE INVENTION

1. Field of Invention

This invention relates to an image processing method and system. More particularly, this invention classifies input image pixels into different classifications prior to output.

2. Description of Related Art

In digital reproduction of documents such as in the digital copier environment, a document is first optically scanned and converted to a gray scale image. In the case of color reproduction, the document may be converted to a gray scale image of several separations, such as the R, G and B separations. In order to produce a hard copy of the scanned and digitized image, the image has to be further processed according to the requirements of the marking engine. For example, if the marking engine is capable of bi-level printing, then the image has to be rendered into a 1-bit bit map for printing. To preserve the appearance of a gray scale image in a binary output, often some digital halftoning process is used in which the multi-bit input image is screened with a periodic array. However, if the original image itself contains halftone screen, objectionable moiré patterns may occur due to the interference between the original and the new screens. Also, while dot screen halftoning may be good for rendering continuous tone originals, it may degrade the quality of text and line drawings. Often a document contains different types of images. In order to achieve optimal image quality in document reproduction, a system capable of automatically identifying different types of images within a page is needed. For example, if an image part is identified as halftone, then some kind of low-pass filtering may be applied prior to halftone screening so the gray scale appearance can be preserved without introducing moiré patterns. For text area, some sharpness enhancement filter could be applied and other rendering techniques such as thresholding or error diffusion could be used.

Early work on image segmentation for the purpose of document reproduction dates back to the 1970s. U.S. Pat. No. 4,194,221, the subject matter of which is incorporated herein by reference, discloses a method for automatic multimode reproduction. It employs autocorrelation in halftone detection. Since then, a lot of work has been published in the area of image segmentation. See, for example, U.S. Pat. 4,740,843, the subject matter of which is incorporated herein by reference, discloses the method of halftone image detection by measuring the distance between successive gray level maxima. U.S. Pat. No. 5,341,277, the subject matter of which is incorporated herein by reference, discloses a dot image discrimination method that counts density change points within an area. One disadvantage that is common to the existing image segmentation systems is the rigidity of the system structure. Usually the system only provides several programmable parameters used for thresholds in detecting video maximum/minimum, halftone dot counting, etc. It does not provide much flexibility to support processing/rendering optimization and to cope with requirement change. There are other shortcomings in the existing segmentation systems that are related to using fixed threshold in halftone dot detection, using simple average in halftone dot counting, etc., which could result in misclassification in certain area.

SUMMARY OF THE INVENTION

The present invention provides a method and apparatus for classifying image data. In one embodiment, a video peak/valley counter may count one of peaks and valleys within a window of the input image data. A local roughness device may determine a local roughness of the input image data. In one embodiment, the input image data may be classified based on the count of the video peak/valley counter device and the local roughness of the local roughness detector.

In one embodiment, a neighborhood average gray value may be determined for the input image data. A pixel under consideration may be evaluated to determine if it is a peak or valley based on whether its brightness is greater or less than a peak threshold value or valley threshold value, which are based on the neighborhood average gray value.

In one embodiment, a peak/valley detection device may determine one of a peak and a valley count within a window of the image data around a pixel under consideration. A neighborhood checking device may check whether any video peaks or valleys are located within a neighborhood of the pixel under consideration.

In one embodiment, a halftone dot count of a window may be determined. If the determined halftone dot count is less than a predetermined number, then a neighborhood of the pixel under consideration is checked for any peaks and valleys. The data is then classified based on the number of peaks and valleys if there are any peaks or valleys within the neighborhood.

In one embodiment, pixels within a window may be evaluated to determine respective peaks and valleys. Each of the pixels within the window may be evaluated unless any pixel within a neighborhood of a desired pixel has previously been classified as a peak or valley.

In one embodiment, a processing device may determine a peak or valley within a window of the image data. The window may include a neighborhood of pixels about a specified pixel. The processing device may determine the peaks and valleys within the window unless a pixel within the neighborhood has been determined to be a peak or valley.

Other objects, advantages and salient features of the invention will become apparent from the following detailed description taken in conjunction with the annexed drawings which disclose preferred embodiments of the invention.

BRIEF DESCRIPTION OF THE DRAWINGS

The invention will be described with reference to the following drawings in which like reference numerals refer to like elements and wherein:

FIGS. 5A and 5B show examples of a video context window;

DETAILED DESCRIPTION OF PREFERRED EMBODIMENTS

In accordance with one embodiment of the present invention, segmentation may classify an image, on a per pixel basis, into one of several possible classifications. For example, input video pixels may be classified, on a pixel-by-pixel basis, into one of 32 different image types. This classification may be known as tags or effect pointers. The tags may be used by downstream image processing to specify different filtering, rendering and other operations based on the classification.

Figure 1:
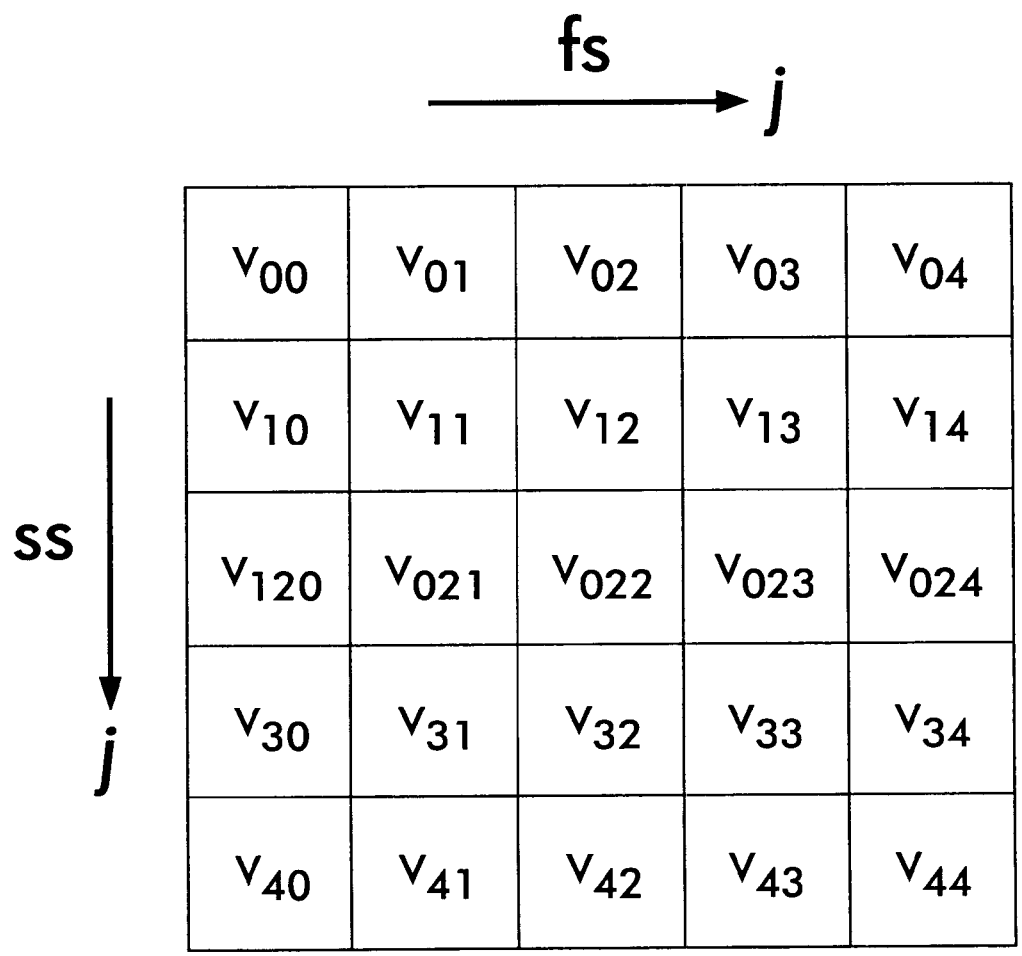
FIG. 1 shows one example of a video matrix.

The present invention preferably accomplishes this by looking at a 5×5 (fast scan by slow scan) pixel context and determining various characteristics such as the presence and magnitudes of edges (horizontal or vertical), average value of video, minimum and maximum values of video, etc. Many of the functions in the segmentation process are easily defined in terms of the 5×5 video matrix. This matrix is shown in FIG. 1 and can be viewed as a "window" that slides across and down the input image. The center pixel, $V_{22}$, is the pixel being processed/classified. The pixels may be generally referenced as $V_{ij}$ where i is the slow scan index and j is the fast scan index. A video matrix of 5×5 is used herein as a preferred example; however, video matrices other than 5×5 are also within the scope of this invention.

The shift array may develop the video context matrix as the input image moves through the processing architecture. The outputs of this module may be fed into the various modules that need all or some of this context. The data is preferably stored in a buffer or buffer-like device prior to and during preprocessing. Accordingly, as soon as the value of pixel $V_{44}$ is available, the classification of pixel $V_{22}$ can be started. A shift array may be used that brings in the current scan line and the four previous scan lines that have been stored in the scan line buffers.

Figure 2:
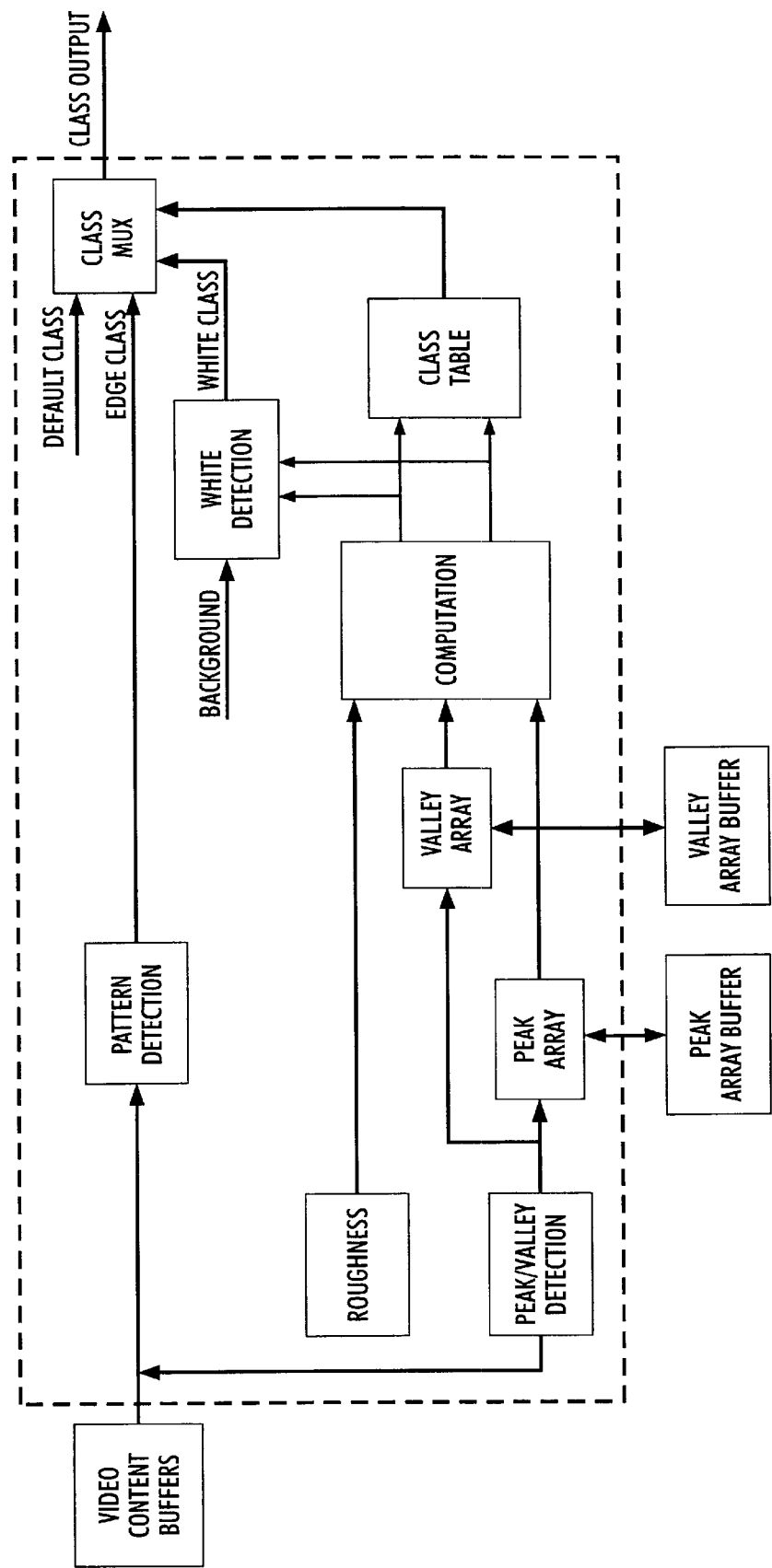
FIG. 2 shows one embodiment of the present invention.

FIG. 2 shows a possible architecture for the image segmentation apparatus and method according to the present invention. One skilled in the art would understand that processing may occur on a special purpose computer, a programmed microprocessor or microcontroller and peripheral integrated circuit elements, an ASIC or other integrated circuit, a hardwired electronic or logic circuit such as a discrete element circuit, a programmable logic device such as a PLD, PLA, FPGA or PAL, or the like. Furthermore, specific algorithms may be accomplished using software in combination with specific hardware.

As shown in FIG. 2, two major features that may be extracted for segmentation in accordance with an embodiment of the present invention are video peak/valley count within a window containing the pixel being classified and the local roughness. Local roughness may represent the degree of gray level discontinuity computed as a combination of some gradient operators. One example of local roughness is the difference between the maximum and minimum of nine 3×3 window sums within a 5×5 video context. Other methods of determining the local roughness are also within the scope of the present invention. On the other hand, a pixel may be considered as a video peak or valley if its gray level is the highest or lowest in the neighborhood and the gray level difference between the pixel and the neighborhood average is greater than a certain threshold. Other methods of determining video peaks and/or valleys are also within the scope of the present invention.

Figure 3:
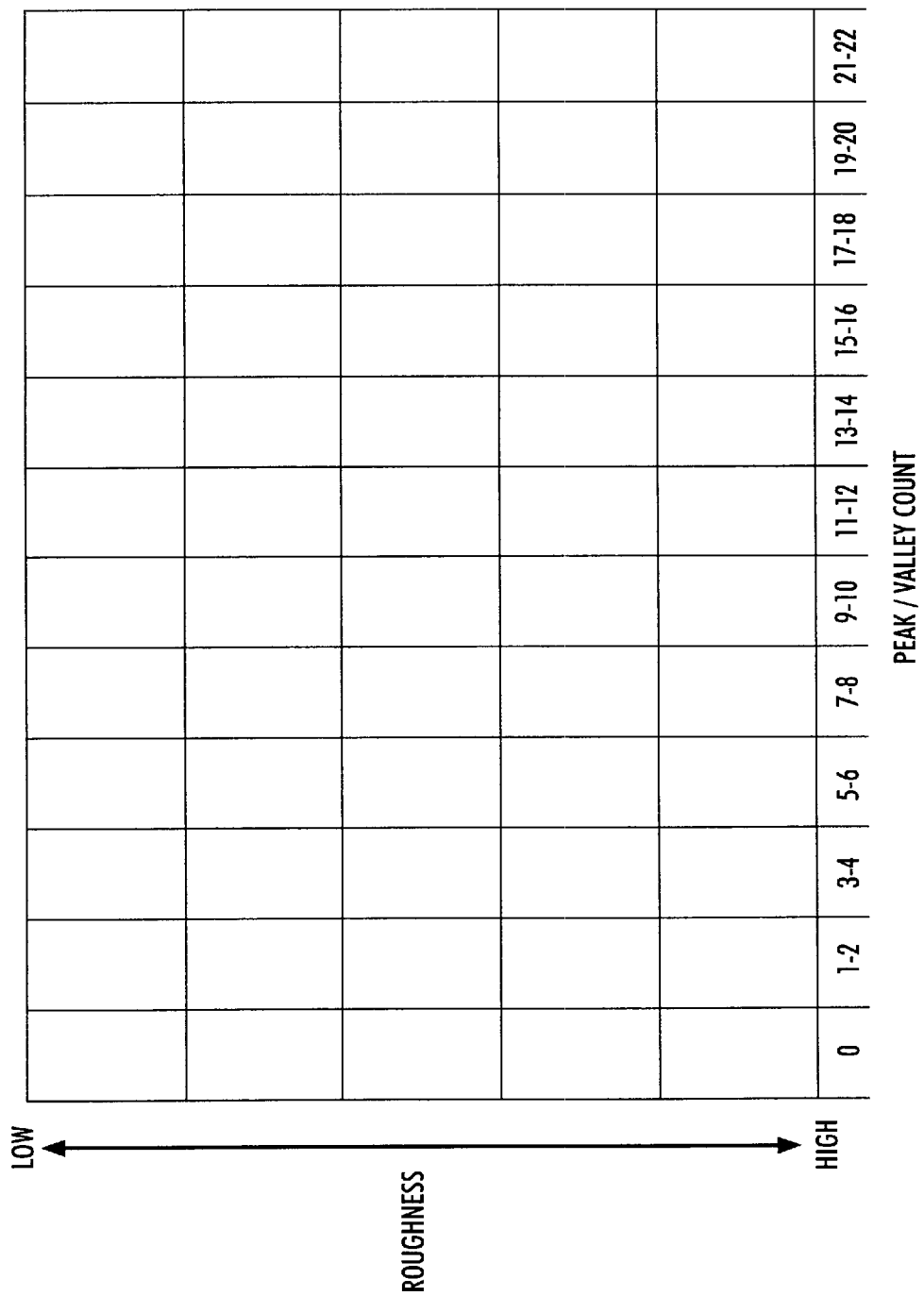
FIG. 3 shows a two-dimensional look-up table in accordance with the present invention.

Several lines of peak and valley patterns may be recorded in scan line buffers for computing peak/valley count within a defined window. In accordance with one embodiment, peak/valley count and local roughness may be used as indices to form a two-dimensional look-up table (hereafter also called a classification table) as a basis to classify data. FIG. 3 shows one example of a two-dimensional look-up table that uses five roughness levels and twelve peak/valley count levels. This results in sixty classification table entries (i.e., 5×12=60). Depending on a location within the lookup table, the video data may be mapped to certain classes such as low frequency halftone, high frequency halftone, smooth continuous tone, rough continuous tone, edge, text on halftone, etc. Depending on the class, the input data may be processed differently.

The two-dimensional look-up table allows for flexibility in processing and rendering decision making, which in turn makes it possible to use a smaller video context and intermediate results buffer in the segmentation, and at the same time improve the image quality in areas such as stochastic screens, line screens, etc.

The look-up table (i.e., classification table) may be complemented with some special classes. One of them is the "edge class". It tries to identify some line art and kanji area that could be missed by the look-up table. Another special class is the "white class". It makes use of the absolute gray level information in addition to peak/valley count and roughness. The "default class" shown in FIG. 2 may be used for the borders of an image. The classification look-up table output may be multiplexed with the special classes to produce the final classification of a pixel (i.e., class output). The classification table assignment may be programmable, which allows for more flexibility in rendering adjustment.

Figure 4:
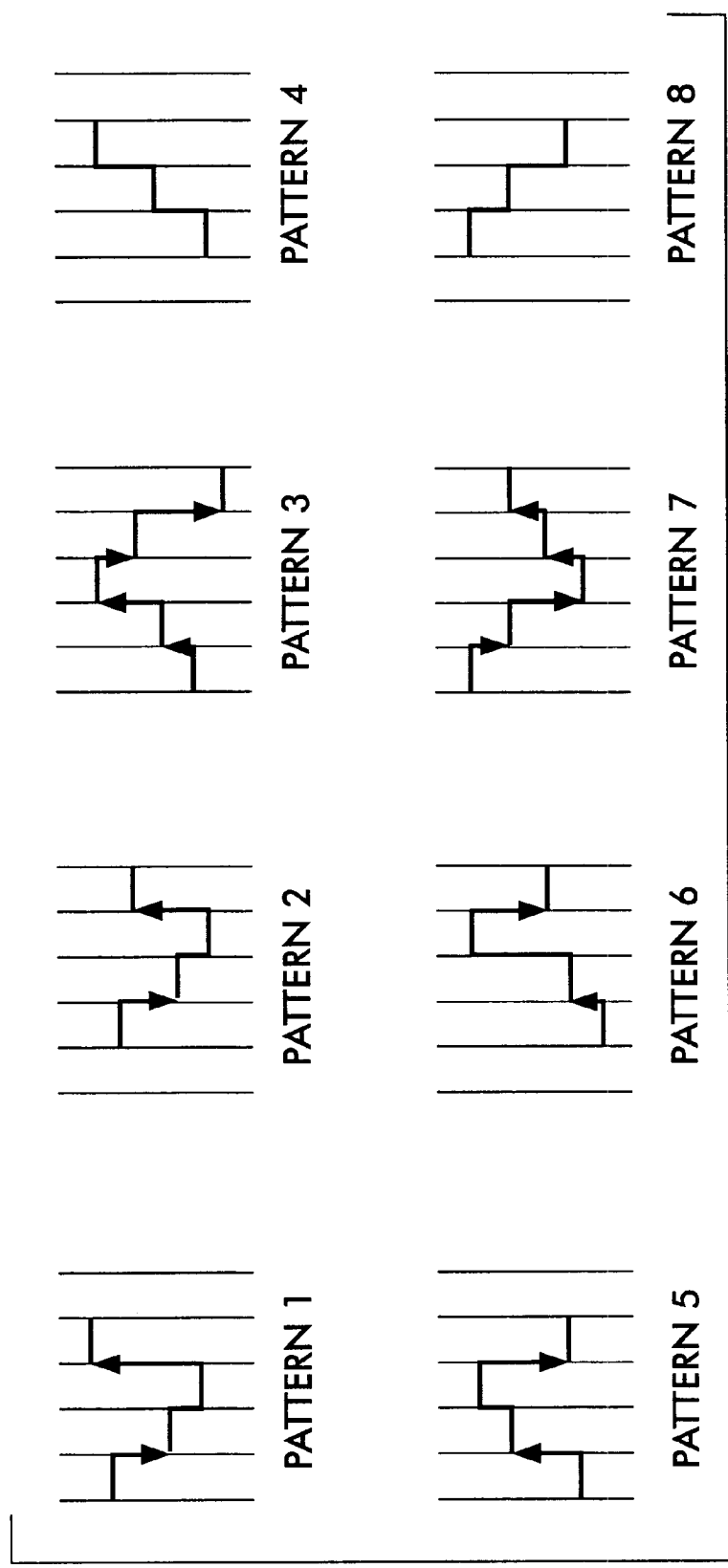
FIG. 4 shows eight patterns.

As described above with respect to one embodiment, major features that may be extracted for segmentation include local roughness and video peak/valley count. The local roughness may be the difference between the maximum and minimum of a nine 3×3 window sum within a 5×5 video context, which extracts edge and text information effectively in most cases. However, the roughness detector are not sensitive to some line art and kanji text patterns and are prone to false detection of video peak/valley. To limit these problems, in one embodiment pattern detection may be introduced to complement other parts of the segmentation algorithm. This technique looks at the pattern of pixels across a scan line (or matrix) in order to classify the data. FIG. 4 shows eight examples of patterns which may be used in the segmentation algorithm of the present invention. In this figure, ↑ and ↓ denote transitions required across one line of the 5×5 video context while ↕ represents that a certain threshold has to be met. These patterns are best defined according to certain parameters that must be met to classify the pixels as corresponding to a pattern. One embodiment of these parameters are described below. One skilled in the art would understand how these rule-based parameters are implemented in the algorithm of the present invention.

$V_{ij}$ represents the pixel at the ith row and the jth column with the row being in the fast scan direction and the column being in the slow scan direction.

Next, sumSS[j] is defined as the sum of the five pixels in the jth column, or $$sumSs[j] = \sum_{i=0}^{4} V_{i,j} o <= j <= 4.$$

Another variable array is updownFs[j], 0<=j<=3. This is used to signal transitions. The assignment is determined as following: if the following conditions are met i) $V_{ij} <= V_{ij+1}$ for all i ii) sumSs[j]<sumSs[j+1]

then updownFs[j] is assigned the value 1; on the other hand, if the following conditions are met i) $V_{ij} >= V_{ij+1}$ for all i ii) sums[j]>sumSs[j+1]

then updownFs[j] is assigned the value 2. Otherwise, updownFs[j] will be neither 1 nor 2.

Patterns 1–8 shown in FIG. 4 are then classified as corresponding to a specific pattern based on several variables. In a preferred embodiment, this pattern classification is as follows:

Pattern 1.
i) updownFs[0]=2
ii) updownFs[2]=1
iii) min(sumSs[0],sumSs[3]-min(sumSs[2],sumSs[2])>SuMDIF1

Pattern 2.
i) updownFs[1]=2
ii) updownF3[3]=1
iii) min(sumSs[1],sumSs[4])-min(sumSs[2],sumSs[3])>SUMDIF1

Pattern 3.
i) updownFs[0]=1
ii) updownFs[1]=1
iii) updownFs[2]=2
iv) updownFs[3]=2
v) sumSs[2]-sumSs[0]>SUMDIF2
vi) sumSs[2]-sumSs[4]>SUMDIF2

Pattern 4.
i) sumSs[3]-sumSs[2]>SUMDIF3
ii) sumSs[2]-sumSs[1]>SUMDIF3

Pattern 5.
i) updownFs[1]=1
ii) updownFs[2]=2
iii) max(sumSs[1],sumSs[2])-max(sumSs[0],sumSs[3])>SUMDIF4

Pattern 6.
i) updownFs[1]=1
ii) updownFs[3]=2
iii) max(sumSs[2],sumSs[3])-max(sumSs[1],sumSs[4])>SUMDIF4

Pattern 7.
i) updownFs[0]=2
ii) updownFs[1]=2
iii) updownFs[2]=1
iv) updownFs[3]=1
v) sumSs[0]-sumSs[2]>SUMDIF5
vi) sumSs[4]-sumSs[3]>SUMDIF5

Pattern 8.
i) sumSs[1]-sumSs[2]>SUMDIF6
ii) sumSs[2]-sumSs[3]>SUMDIF6

FIGS. 5A and 5B show examples of a 5×5 video context window with the pixel values shown. The numbers (200, 50 etc.) are gray levels of the pixels. By using such a pattern detector, then text areas can be detected that would not be detected by a roughness detector. As can be seen, FIG. 5A corresponds to Pattern 1 shown in FIG. 4 while FIG. 5B shows an example of a video context window corresponding to Pattern 3.

The patterns described above identify certain gray level transitions in the fast scan direction. Patterns in the slow scan direction may also be detected in accordance with the present invention.

In processing and rendering of background areas, a white class may be desirable that makes use of the absolute gray value of the pixel as well. In accordance with one embodiment of the present invention three features may be used in detecting white class, namely, the brightness, the roughness and the halftone dot count. Prior segmentation schemes rely only on peak/valley count and background threshold to determine white class. However, including both roughness and halftone dot count to detect a white class adds flexibility to the algorithm without a significant cost increase.

In order to qualify as white, first the gray level of the pixel under classification should be greater than a predetermined value. The predetermined value may be a default number or may be obtained by computing the lead edge histogram of the image and detecting the peak at the light end of the histogram. The histogram of the whole page may also be used if it is available. Second, the local roughness of the pixel should also be below a certain threshold. As discussed above, the local roughness may be the difference between the maximum and minimum of the nine 3×3 window sums within a 5×5 video context. Third, the halftone dot count within a defined neighborhood of the pixel should be small enough.

As is well known to one skilled in the art, low-frequency halftone images are often processed and rendered differently than other types of pictorials such as high-frequency halftones, continuous tones, etc. For example, high-frequency images may be converted to continuous tone images using a low-pass filter and then re-screened for printing. Low-frequency halftones, on the other hand, are often rendered with error diffusion. There are many circumstances in which a non low-frequency area could be classified as a low-frequency halftone if the video peak/valley count is the only criterion. Stochastic screen originals and line screen originals are some typical examples. Also, some part of high-frequency halftones may be misclassified as low-frequency image areas due to the missing peaks/valleys in some local areas. False detection of low-frequency halftone may result in severe artifacts. One embodiment of the present invention uses a neighborhood checking mechanism to reduce the false detection of low-frequency halftones.

Figure 6:
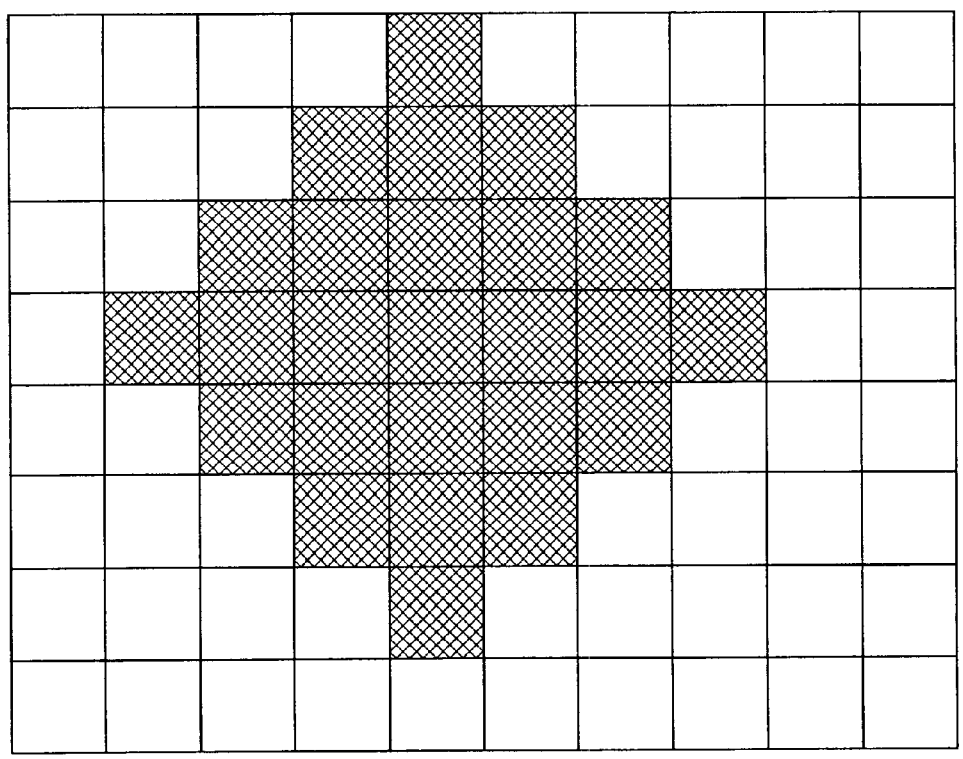
FIG. 6 shows one example of a neighborhood for a pixel under consideration.

As discussed above, with respect to one embodiment, the halftone dot within a window (i.e., 24 columns by 8 lines) and the local roughness may be used as indices to form the look-up table. The entries of the look-up table are then mapped to certain number of classes. Neighborhood checking may be performed when the halftone dot count within the window is smaller than a programmable parameter. The algorithm checks a defined neighborhood of any peak/valley within the window. FIG. 6 shows one example of the shaded pixels forming the neighborhood of the black pixel. If there are peaks/valleys in the neighborhood of a peak/valley, then instead of using the original halftone dot count, a special index may be given to the pixel under detection. This neighborhood checking ensures that unless the video peaks/valleys within a window are some distance apart, the pixel will not be considered as a low-frequency halftone. That is, if there are closely located peaks/valleys within a window, then the pixel is not part of a low-frequency halftone but rather may be a high-frequency halftone.

Figure 7:
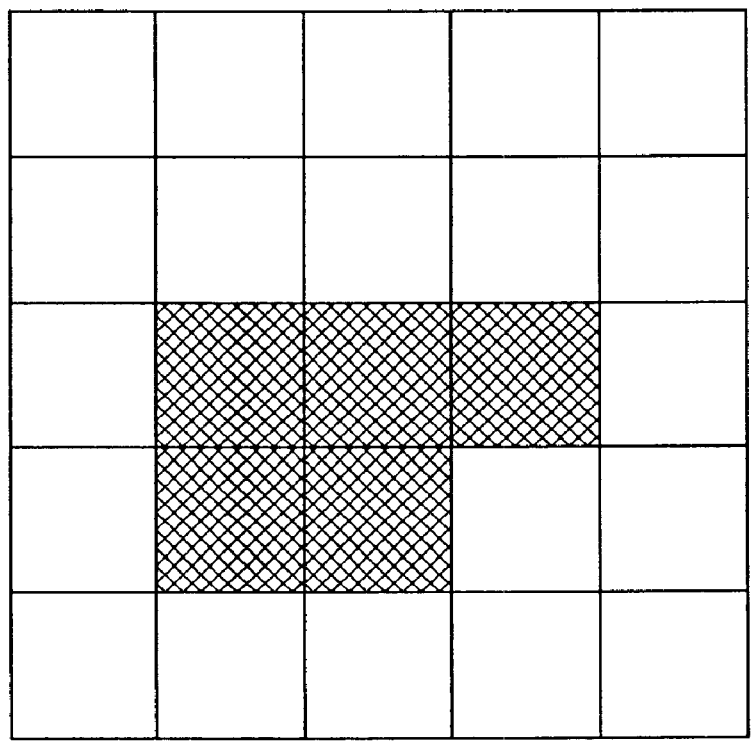
FIG. 7 shows another example of a neighborhood for a pixel under consideration.

FIG. 7 shows a similar embodiment in which the black pixel is under detection and the shaded pixels are neighboring pixels of interest. Using appropriate logic such as hardware, the pixel under detection will not be considered as a peak or a valley if any of the neighboring pixels of interest (i.e., the shaded pixels) are peaks or valleys. In other words, since by the time the pixel under detection is being examined and the neighboring pixels of interest have all been detected, the logic is easy to implement in hardware. The logic guarantees that if a pixel is detected as a peak or valley, then none of its eight immediate neighbors will be peaks or valleys.

Figure 8A:
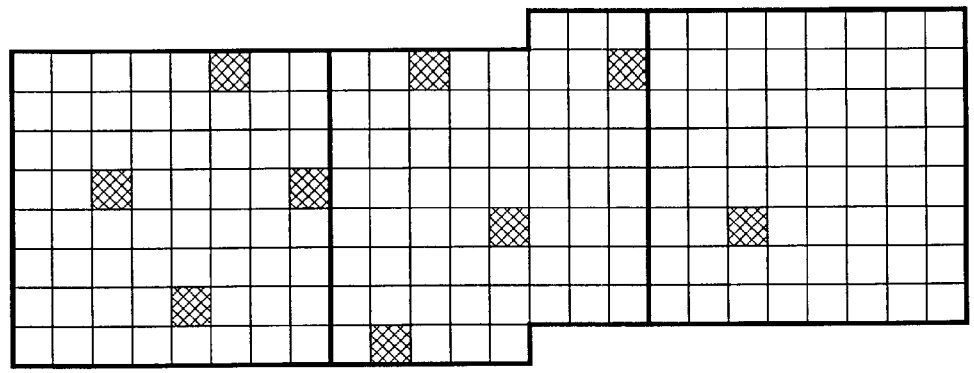
FIGS. 8A and 8B show video peaks and valleys in a 24×8 window.

In one embodiment of the present invention, a triple window may be used to determine peak/valley counts and the halftone dot count average associated with the pixel under classification. For example, the peak/valley information in a window of 24 columns by 8 lines around a pixel is examined. FIG. 8A shows the 24×8 window divided into three smaller (8×8) windows. In each of the 8×8 windows, the greater of the peak and valley counts is chosen to represent the halftone dot count of that window. This improves the accuracy of counting in the area with major gray level changes.

Given the halftone dot counts of the three 8×8 windows, a set of rules may be used to determine the final halftone dot count associated with the pixel under classification. The halftone dot counts of the three windows are considered dotLeft, dotMid and dotRight respectively, and dotCount is the final halftone dot count. The rules can be described by the following C-like statement,

```
if (dotLeft>dotMid&&dotMid<dotRight)
{
    dotCount=min(dotLeft,dotRight)*2;
}
else if (dotLeft<dotMid&&dotMid>dotRight)
{
    if (min(dotLeft,dotRight)=LOW COUNT)
    {
        dotCount=dotMid+dotRight;
    }
    else
    {
        dotCount max(dotMid,dotright)*2;
    }
}
else
{
    if (dotMid>=LOWCOUNT)
    {
        dotCount=doMid+max(dotLeft,dotRight);
    }
    else
    {
        dotCount=dotMid+min(dotLeft,dotRight);
    }
}
``` where LOWCOUNT is a programmable parameter.

Using the above rules instead of simple averaging improves the halftone dot count in areas of peak/valley misdetection or where peak/valley density transitions occur.

Figure 8B:
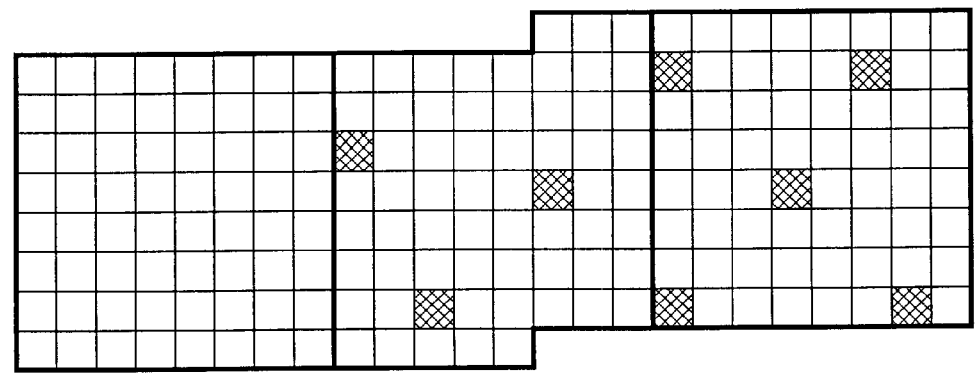

More specifically, FIG. 8A shows an example of video peak pattern in a 24×8 window and FIG. 8B shows an example of video valley pattern in a 24×8 window. The dotLeft, dotMid and dotRight are 4, 4 and 5 respectively. If LOWCOUNT is set to be 3, then dotCount, which reflects two thirds of the halftone dot count within the 24×8 window, is 9. This type of rule-based calculation generally works better than simple averaging in transitional areas.

The gray difference between a peak or valley and its neighbors is greatest in mid-tone areas as compared to highlight or shadow areas. Thus, one embodiment of the present invention links the threshold for peak/valley detection to the neighborhood average gray value so as to reduce misclassification. For example, a pixel may be considered as a video peak/valley if its gray level is the highest/lowest in the neighborhood and also, the gray level difference between the pixel and the neighborhood average is greater than a certain threshold. The qualifying conditions of peak/valley and the definition of neighborhood may vary. If the threshold for peak/valley detection is set too high, then some halftone dots in the highlight or shadow area may be missed. On the other hand, if the threshold is set too low, then some potential noise or non-halftone video gray level variation could be falsely identified as halftone dots. To reduce misclassification, the threshold for peak/valley detection may be tied to the neighborhood average gray value.

Figure 9:
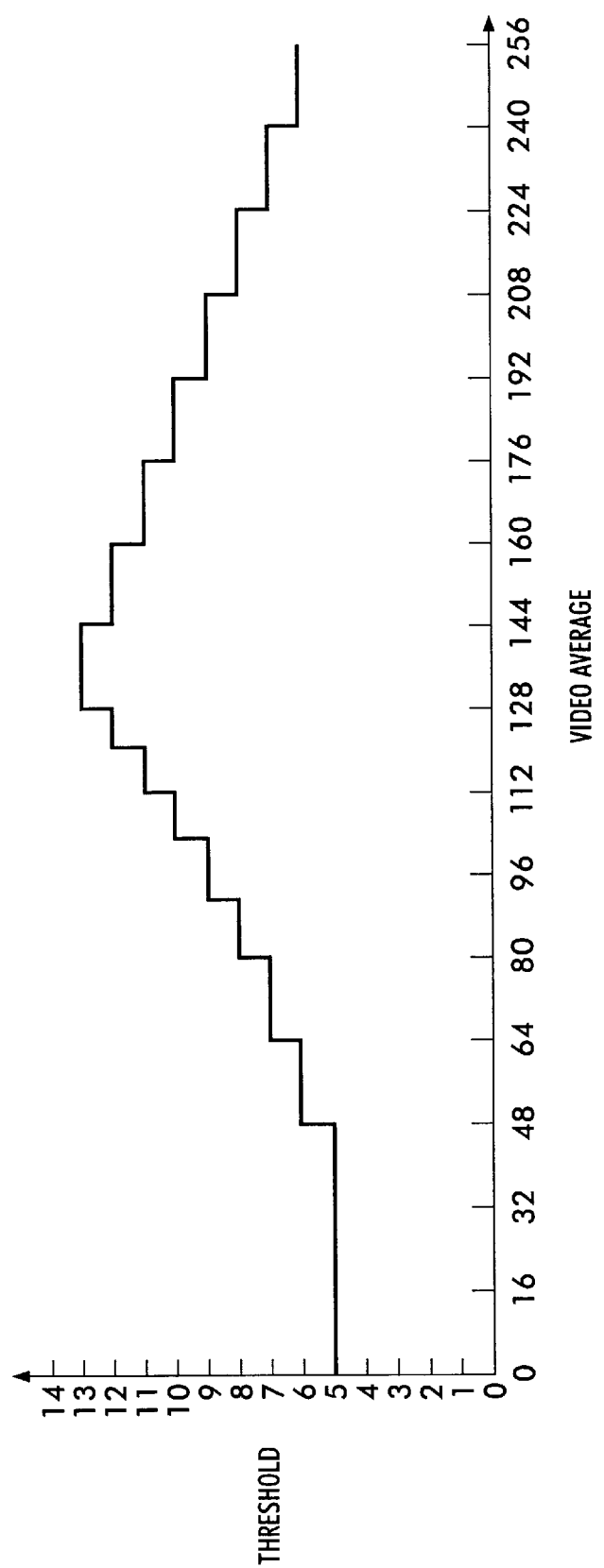
FIG. 9 shows a plot of threshold and video average in accordance with the present invention.

The threshold-video average correlation may be established through statistical analysis. The implementation may be a look-up table or some simple formula. For example, the Threshold-Video_Average plot shown in FIG. 9 may be represented by the following equation, $$\text{Threshold} = \begin{array}{ll} C1 - Video\_Average/16 & \text{for } Video\_Average > MT \\ C2 + Video\_Average^2/2048 & \text{for } Video\_Average <= MT \end{array} \text{ with } C1 = 21, C2 = 5 \text{ and } MT = 128.$$

A 16-entry table may be used to achieve similar results.

An implementation of this approach has been tested with the video average calculated as the average of the eight immediate neighbors of the pixel under detection for peak/valley.

In at least one embodiment of the present invention, video averaging is used to reduce the possibility of misclassifying peaks and valleys.

Halftone dots, when present in the form of video peaks, generally occur in areas with relatively low average gray value. The converse is true for halftone dots in the form of video valley. By limiting peak detection to the area where the video average is below a certain threshold and limiting valley detection to the area where the video average is above certain threshold, some false detection can be prevented. The threshold for peak detection may be set to be greater than the threshold for valley detection by some margin, making sure that halftone dots will not be missed. The video average could be the average gray level of a 5×5 window.

While the invention has been described in relation to preferred embodiments, many modifications and variations are apparent from the description of the invention, and all such modifications and variations are intended to be within the scope of the present invention as defined in the appended claims.

What is claimed is:

1. An apparatus for classifying image data comprising: an input device that receives the image data;
   a peak/valley detection device that receives the image data and determines a peak count and a valley count within a window of the image data around a pixel under consideration, wherein the peak/valley detection device includes a neighborhood checking device that checks whether any peaks or valleys are located within a neighborhood of the pixel under consideration; and
   a classification device that determines a class of the pixel under consideration directly based on the value of the greater of a peak count of the peaks within the window and a valley count of the valleys within the window.

2. The apparatus of claim 1, further comprising a local roughness device that determines a local roughness of the input image data, and the classification device determines the class further based on the local roughness determined by the local roughness detector.

3. The apparatus of claim 1, further comprising a halftone detector for determining a halftone dot count of the peaks and valleys in the window of the image data.

4. The apparatus of claim 3, wherein the neighborhood checking device determines a distance between the peaks and valleys within the neighborhood after the halftone dot detector determines the halftone dot count is less than a predetermined number.

5. A method of classifying input image data comprising:

receiving the image data;

determining a halftone dot count of a window of the image data including a pixel under consideration;

if the determined halftone dot count is less than a predetermined number, then checking a neighborhood of the pixel under consideration for any peaks and valleys; and classifying the pixel under consideration based on the greater of a peak count of a number of peaks within the window and a valley count of a number of valleys within the window.

6. The method of claim 5, further comprising:

determining a local roughness of the window of the image data; and classifying the pixel under consideration further based on the determined local roughness.

7. A method of classifying input image data comprising:

receiving the image data;

evaluating pixels within a window of the image data, wherein each of the pixels within the window is evaluated unless any pixel within a neighborhood of a desired pixel has been classified as a peak or a valley; and classifying the pixel under consideration, when no pixel within the neighborhood is a peak or valley based on the greater of a peak count of the peaks within the window and a valley count of the valleys within the window.

8. The method of claim 7, further comprising processing the image data based on the classification of the image data.

9. The method of claim 7, wherein the classifying step is further based on a gray level difference between a pixel under consideration and a neighborhood average gray value.

10. An apparatus that classifies image data comprising:

an image input device that receives the input data;

a processing device that determines peaks and valleys within a window of the image data, wherein the window includes a neighborhood of pixels about a specified pixel, the processing device determining the peaks and valleys within the window unless a pixel within the neighborhood about the specified pixel has been determined to be a peak or valley; and a classification device that determines a class of the pixel under consideration based on the greater of a peak count of the peaks within the window and a valley count of the valleys within the window.

11. The apparatus of claim 10, further comprising an output device that processes the image data based on a classification output form the classification device.

12. The apparatus of claim 1, further comprising an output device that outputs a signal based on the class of the pixel under consideration determined by the classification device.

* * * * *